United States Patent [19]
Beggs et al.

[11] 3,749,386
[45] July 31, 1973

[54] METHOD AND MEANS FOR REDUCING IRON OXIDES IN A GASEOUS REDUCTION PROCESS

[75] Inventors: Donald Beggs, Toledo; William T. Marston, Whitehouse, both of Ohio

[73] Assignee: Midland-Ross Corporation, Toledo, Ohio

[22] Filed: July 1, 1971

[21] Appl. No.: 158,905

Related U.S. Application Data
[62] Division of Ser. No. 883,889, Dec. 10, 1969.

[52] U.S. Cl. ............................ 266/29, 75/35, 266/24
[51] Int. Cl. .............................................. F27d 17/00
[58] Field of Search .................... 75/34, 35; 266/24, 266/25, 29

[56] References Cited
UNITED STATES PATENTS

| | | | |
|---|---|---|---|
| 2,670,946 | 3/1954 | Royster | 266/25 |
| 3,193,378 | 7/1965 | Peet | 75/35 |
| 2,807,535 | 9/1957 | Segre | 266/25 |
| 2,048,112 | 7/1936 | Gahl | 75/35 |
| 1,984,727 | 12/1934 | Brown | 75/35 |
| 2,740,706 | 4/1956 | Paull et al. | 75/35 |
| 2,865,732 | 12/1958 | Jensen | 75/35 |

Primary Examiner—Gerald A. Dost
Attorney—Peter Vrahotes et al.

[57] ABSTRACT

This is a disclosure of a method and apparatus for reducing iron oxides to metallized pellets and includes the desulphurization of gases containing sulphur and/or compounds of sulphur, especially $H_2S$. The disclosure is particularly concerned with the metallization of iron oxides through a gaseous reduction process wherein the spent gas is used to cool the pellets before discharge from the furnace, and then is upgraded for continued use. It has also been found that activated iron particles, such as sponge iron and metallized pellets, are highly effective for the removal of sulphur impurities from such gas.

5 Claims, 1 Drawing Figure

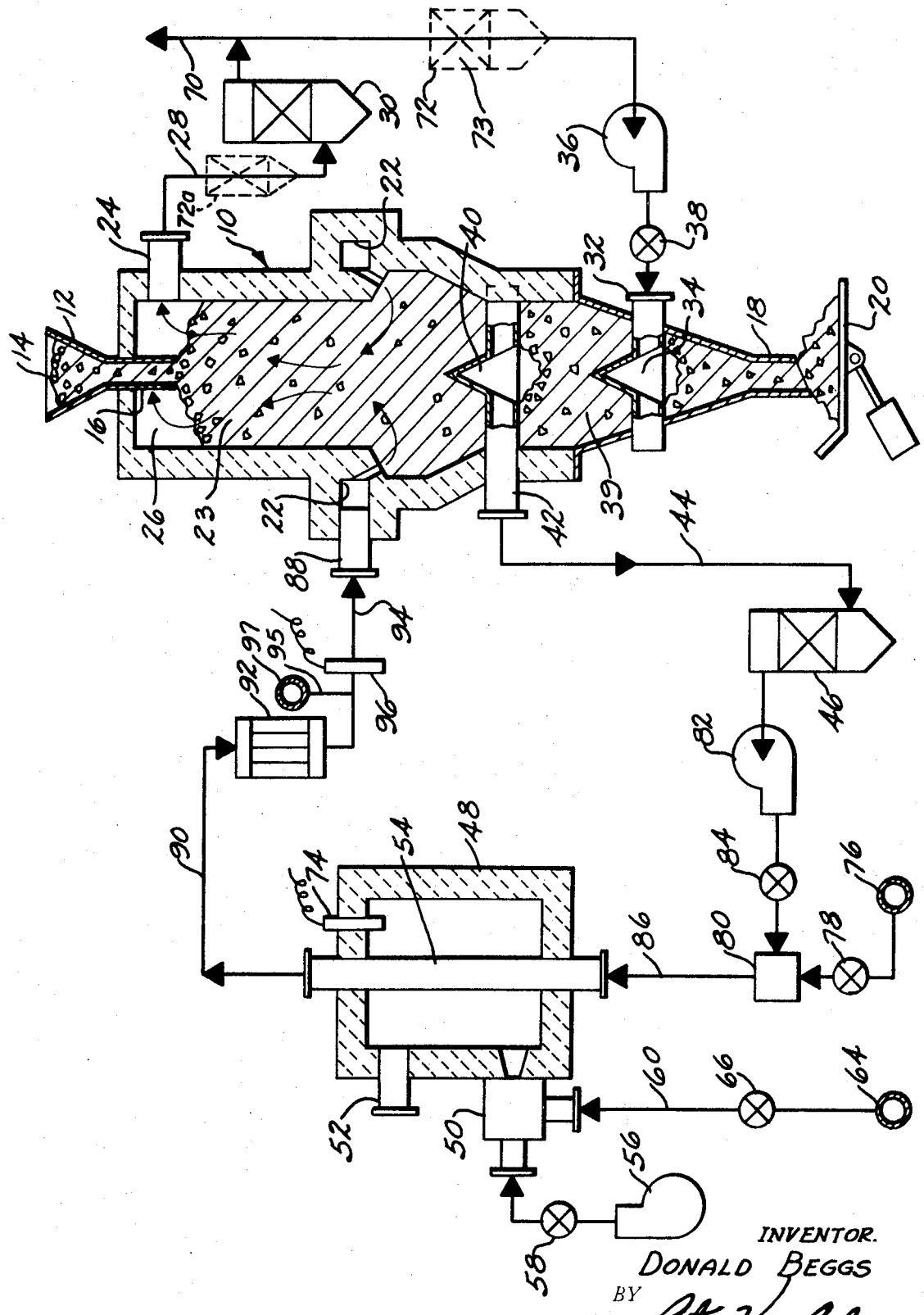

METHOD AND MEANS FOR REDUCING IRON OXIDES IN A GASEOUS REDUCTION PROCESS

This is a division of U.S. Pat. application Ser. No. 883,889 filed Dec. 10, 1969.

A need exists in many commercial processes for an effective and inexpensive method of removing sulphur and/or its compounds, particularly $H_2S$, from a process gas. One such process wherein this need exists is the reduction of iron oxide ores into metallized pellets wherein the iron oxide is reduced by a gas containing $H_2$ and/or CO. Certain gaseous reduction processes utilize the spent gases, or off-gases, by converting the $H_2O$ and $CO_2$ from such spent gases to $H_2$ and CO through reaction of the off-gas with a hydrocarbon such as natural gas. When the iron ore contains a high percentage of sulphur, the sulphur reacts with the reducing gas to form $H_2S$ which, of course, is a gas. The most widely used method of removing $H_2S$ from a gas is to utilize activated iron oxide chips in a bed. Although such a bed is effective in the removal of $H_2S$, the capital investment is large, and the size of the apparatus requires a considerable amount of space.

It is, therefore, an object of this invention to provide novel method and means for metallizing iron oxides.

It is another object of this invention to provide a novel method for removal of $H_2S$ from a gas mixture.

It is a further object of this invention to provide a novel method for reducing iron oxide to metallic iron while removing sulphur from said iron oxide.

It is still another object to provide apparatus for metallizing iron oxide through a gaseous reduction means which includes sulphur removal means.

It is a still further object of this invention to provide method and means for a gaseous reduction process where full utilization of spent gases is achieved.

It has been found that activated iron particles are capable of effectively removing hydrogen sulphide from a reducing gas. Throughout this specification and the appended claims, the term "activated from particles" is defined at that class of material resulting when iron ore or iron oxide is reacted with a reductant such as hydrogen, carbon monoxide, solid carbonaceous material, or a hydrocarbon, and the iron oxide is converted to metallic iron by the reaction of the reductant with the iron oxide to give off $H_2O$ and/or $CO_2$, thereby leaving metallic iron in a highly reactive state. This includes sponge iron and metallized iron pellets.

This discovery has particular utility where spent gas is upgraded in a catalytic reformer by reacting the $CO_2$ and $H_2O$ in the spent gas with a hydrocarbon to form $H_2$ and CO. The presence of the $H_2S$ in a spent gas neutralizes the effect of the catalyst resulting in a reaction which is reduced considerably. In utilizing this discovery, a more advantageous method and means for metallizing iron oxides has been found which results in more production even where the need to eliminate sulphur does not exist.

In the single FIGURE of the drawing, a cross sectional view, partially schematic, of an apparatus is shown which utilizes and demonstrates the invention of this disclosure.

Referring to the drawing, a vertical shaft type reduction furnace is shown generally at 10, having a feed hopper 12 into which iron oxide pellets, compacts, or lumps 14 are fed. The pellets 14 descent by gravity into the shaft furnace 10 from hopper 12 through a pellet feed pipe 16. The pellet feed pipe 16 also serves as a gas seal pipe. At the bottom of shaft furnace 10 is a pellet discharge pipe 18 which also serves as a gas seal pipe. A pellet discharge feeder 20 of conventional type, such as an electric vibrating feeder, is located below the discharge pipe 18 and receives metallic iron pellets, hereinafter referred to as metallized pellets, thereby establishing gravitational descent of the pellet burden in shaft furnace 10.

At the upper portion of shaft furnace 10 is a bustle and tuyere system, indicated generally at 22, through which hot reducing gas at a temperature between 1,250° and 1,500° F. is introduced to flow upwardly in a pellet reduction region 23 is counterflow relationship to the pellets 14, as shown by the arrows, and exits from the furnace through a gas off-take pipe 24 located at the top of the furnace. The pellet feed pipe 16 extends below the off-take pipe 24, which geometric arrangement creates a spent gas disengaging plenum 26 that permits spent gas to disengage from the pellet stockline and flow freely to the off-take pipe. The hot reducing gas, in flowing from bustle and tuyere system 22 of off-take pipe 24, serves to heat the iron oxide pellets and to reduce them to metallic iron.

The spent gas from off-take pipe 24 flows through a pipe 28 to a cooler-scrubber 30 which is provided to cool the spent gas and remove dust. Cooler-scrubber 30 can be of any conventional type such as, for example, a packed tower with the gas flowing upward through the packing counterflow to cooling water. Cooled spent gas is introduced to a lower region of shaft furnace 10 through a cooling inlet pipe 32 which connects to a cooling gas introduction and distributing member 34 located within the furnace and arranged to distribute the cooled spent gas into the pellet burden. A blower 36 together with a flow regulating valve 38 serves to admit the cooled spent gas. The cooled spent gas introduced into the burden at distributing member 34 flows upward in a pellet cooling region 39 in counterflow relationship to the descending pellets and disengages from the burden at a cooling region off-take member 40 which connects to a cooling region off-take pipe 42. The spent gas from off-take pipe 42 flows through a pipe 44 to a cooler-scrubber 46 which is provided to cool and scrub dust out of the spent gas which has passed through pellet cooling region 39 of the shaft furnace 10.

A refurmer furnace 48 having fuel fired burners 50, a flue pipe 52, and a plurality of catalytic reformer tubes 54, only one being shown, is utilized to generate hot reducing gas. Combustion air from a blower 56 is fed to burners 50 through a flow regulating valve 58. Fuel is fed to burners 50 through pipe 60 from a fuel source 64 and flow regulating valve 66.

A temperature sensing element 74 serves to control the burners 50 to maintain the temperature above 1,600° F., normally in the range of 1,600° F. to 2,000° F., in the reformer furnace 48 by control of flow regulating valve 58 in convention fashion. The proper air to fuel ratio for burners 50 is maintained by conventional means, not shown, which serves to regulate flow regulating valve 66. Although the reformer furnace 48 arrangement herein described is a preferred embodiment, other arrangements of reformer furnace might be employed.

Hydrocarbon from a source 76 is admitted to a mixer 80 through a flow regulating valve 78. Spent gas from cooler-scrubber 46 is admitted to mixer 80 by a blower 82 through a flow regulating valve 84. The hydrocarbon/spent gas mixture from mixer 80 is introduced to reformer tubes 54 through pipe 86. Hot reformed gas from reformer tubes 54, which gas serves as the reducing gas for shaft furnace 10, is fed to a gas inlet pipe 88 through a pipe 90, a gas cooler 92, and a pipe 94. Another pipe 95 may be connected to pipe 94 for addition of another gas to the system, such as a hydrocarbon, from a source 97. A temperature sensing element 96 serves to regulate the cooler 92 in order to maintain the desired hot reducing gas temperature at inlet pipe 38. The cooler 92 will generally be required inasmuch as the temperature of the gas leaving the reformer in pipe 90 will ordinarily be higher than is desired for introduction to shaft furnace 10.

In reforming a hydrocarbon, there is a volume gain in the reformer tubes 54 by the well-known reforming reactions. For example, when reforming with methane ($CH_4$):

$$CH_4 + CO_2 \xrightarrow{\Delta} 2CO + 2H_2$$
$$CH_4 + H_2O \xrightarrow{\Delta} CO + 3H_2$$

The volume gain due to reforming is vented as off-gas by a suitable vent pipe 70 adjacent cooler-scrubber 30. If desired, the off-gas from vent pipe 70 can be utilized as supplemental fuel for the reformer furnace to reduce the fuel required from fuel source 64.

Hot reformed gas which is suitable for use as a reducing gas for the direct reduction of iron oxide to metallic iron will contain a relatively high percentage of reductants CO and $H_2$. A high quality hot reducing gas made by reforming a gaseous hydrocarbon such as natural gas, utilizing $CO_2$ and residual water vapor in spent gas from a direct reduction furnace as the reforming oxidants, will contain at least 40 percent to 50 percent $H_2$. It has been found by experience that a hot reducing gas containing such amount of $H_2$ will react with residual sulphur compounds in iron oxide pellets to form $H_2S$ gas (hydrogen sulphide) which leaves the reduction furnace in the spent gas. In the reforming of natural gas with the spent gas from a direct reduction furnace, it has been found that $H_2S$ in the spent gas in amounts of only 20 to 40 parts per million has an extremely adverse effect on the reforming capacity of a reformer. It has further been found that freshly made metallized pellets, which are a highly porous form of sponge iron, will remove $H_2S$ from spent gas, probably by the reaction of metallic iron with $H_2S$ to form an iron sulphide. The freshly made metallized pellets will remove the $H_2S$ at ambient temperature of 60° F. to 70° F., as well as at elevated temperatures.

In the present invention, the spent gas from the shaft type reduction furnace 10 is cooled in cooler-scrubber 30 wherein most of the water vapor formed during the reduction of the iron oxide pellets in the reduction region 23 is condensed. This condensing of water vapor upgrades the CO and $H_2$ content of the spent gas and makes it a suitable gas for cooling the metallized pellets in the cooling region 39, without encountering reoxidation of the pellets. The upgraded spent gas which is introduced into the furnace through distributing member 34 serves to cool the metallized pellets under reducing conditions, while the freshly metallized pellets descending in the cooling region 39 serve to remove any $H_2S$ from the spent gas prior to its leaving the furnace through off-cake pipe 42. Thus, any residual sulphur which is removed from the iron oxide pellets in the upper part of the reduction region 23, before the oxide pellets are reduced to metallic iron, is put back into the metallized pellets in the cooling region 13, thereby providing sulphur-free off-gas for the reformer.

In the operation of the overall process depicted schematically in drawing, the flow of the spent gas through valve 38 is adjusted to substantially match the flow of spent gas through valve 84 to avoid interchange of gases between the reduction region 23 and the cooling region 39 of the shaft furnace 10. Under some circumstances, it may be desirable to adjust the flow through valve 84 to be somewhat greater than that through valve 38 to divert a portion of the reducing gas toward the cooling zone 39 and provide an added increment of reduction time of the pellets prior to their being cooled. In addition, a small amount of a hydrocarbon, such as natural gas or methane, may be added to the reducing gas through pipe 95. The hydrocarbon will react in the reduction region 23 with the iron oxides to produce $H_2$ and CO, and that portion directed toward the cooling zone will pyrolyze to form carbon and hydrogen. The presence of the additional carbon is useful during the subsequent melting of the metallized pellets, and the hydrogen is obviously beneficial. It has been found that the amount of hydrocarbon should not exceed 6 percent of the amount of gas in pipe 94; otherwise, carbon deposits would be excessive.

An alternate embodiment includes a sulphur removal unit 72 having a bed of active iron particles 73. As the spent gas leaves the scrubber-cooler 30, it passes into the sulphur removal unit 72 and the gases come in contact with the activated iron particles 73. Alternately, the sulphur removal unit 72a may be placed upstream from the scrubber-cooler 30. After the gas is exposed to the particles 73, it then passes into the cooling inlet pipe 32 where it serves to cool the pellet burden. This particular embodiment is useful where the quantity of sulphur in the original iron ore is too high for acceptance, or there is a desire to produce substantially sulphur free iron. The activated pellets 73 placed into the bed 72 would serve as scavenger pellets and would remove virtually all of the sulphur in the spent gas. With such removal, the gas going back into the cooling pipe 32 would lack the presence of sulphur, thereby eliminating its deposit in the final product. Although the scavenger metallized pellets 73 would have to be changed periodically, it has been found that the activity of the iron with respect to sulphur removal is extremely high, and the percentage of scavenger pellets to final product is small. The sulphur removal unit 72 may be placed, alternately, intermediate the off-take pipe 24 and scrubber-cooler 30.

In order to gain an insight into the ability of activated iron particles to extract sulpher from a gas stream containing hydrogen, a test was conducted. Activated pellets were employed which had the following analysis:

| Total Iron | Metallic Iron | % Metallized | Carbon | Sulphur |
|---|---|---|---|---|
| 93.2% | 89.7% | 96.3% | 1.65% | 0.012% |

The pellet sample was placed in a Burrell tube furnace with a control thermocouple within the bed. This couple was maintained at 150° F. throughout the test. Five CFH of an endothermic generated gas (approximately 20 percent CO, 40 percent $H_2$, and 38 percent $N_2$) to which was added 5 percent bottled $H_2S$, was passed through the pellet bed. Several pellets were removed from the system at selected time intervals ranging from 1 to 36 hours and analyzed for sulphur. The results were as follows:

| Time | % Sulphur in Bed |
|---|---|
| 1 Hour | 0.14 |
| 2 Hours | 0.17 |
| 3 Hours | 0.23 |
| 6 Hours | 0.39 |
| 12 Hours | 1.82 |
| 24 Hours | 2.67 |
| 36 Hours | 2.80 |

These tests confirm that activated iron particles have the ability to absorb sulphur from an $H_2S$ bearing gas over a long period.

Although only a few embodiments have been shown and described, modification therein and other embodiments will be readily apparent to those skilled in the art, and no limitation in the scope of the invention is intended except as limited by the following claims.

I claim:

1. In an apparatus for the metallizing of iron oxide particles which contain sulphur in a form that will react with a reductant to produce a gas containing a sulphur compound wherein the spent gas from the reducing process is catalytically reformed to produce a reducing gas, the combination comprising: a generally vertically aligned shaft furnace, feeding means for supplying particles to the upper portion of said furnace, removal means for removing particles from the bottom of said furnace whereby a gravitationally descending flow of particles may be established in said furnace, first gas supply means for supplying gas to said furnace intermediate said feeding means and said removal means, first gas removal means intermediate said first gas supply means and said feeding means, gas cooling means having an inlet and an outlet, the inlet of said gas cooling means being in communication with said first gas removal means, second gas supply means intermediate said first gas supply means and said particle removal means, said second gas supply means being in communication with the outlet of said gas cooler, second gas removal means located in said furnace intermediate said first and said second gas supply means, means for catalytically reforming hydrocarbon and oxides at a temperature above 1,600° F., said catalytic reforming means having an inlet and an outlet, said second gas removal means being in communication with said reforming means inlet, and said first gas supply means being in communication with the outlet of said gas reformer.

2. The apparatus of claim 5 including a bed of activated iron particles intermediate and in communication with the outlet of said gas cooling means and said second gas supply means.

3. The apparatus of claim 5 including a bed of activated iron particles intermediate and in communication with said first gas removal means and the inlet of said gas cooling means.

4. In an apparatus for metallizing iron oxide particles in a gaseous reduction process wherein the spent gas from the reducing process is reformed to produce a reducing gas, the combination comprising: a generally vertically aligned furnace, feeding means for supplying particles to the upper portion of said furnace, removal means for removing particles from the bottom of said furnace whereby a gravitationally descending flow of particles may be established in said furnace, first gas supply means for supplying gas to said furnace intermediate said feeding means and said removal means, first gas removal means intermediate said first gas supply means and said feeding means, gas cooling means having an inlet and an outlet, the inlet of said gas cooling means being in communication with said first gas removal means, second gas supply means intermediate said first gas supply means and said particle removal means, said second gas supply means being in communication with the outlet of said gas cooler, second gas removal means located in said furnace intermediate said first and said second gas supply means, gas reforming means having an inlet and an outlet, said second gas removal means being in communication with said reforming means inlet, and said first gas supply means being in communication with the outlet of said gas reformer.

5. The apparatus of claim 10 including means for adding a hydrocarbon to said first gas supply means in an amount not to exceed 6 percent.

* * * * *

UNITED STATES PATENT OFFICE
CERTIFICATE OF CORRECTION

Patent No. 3,749,386                             Dated   July 31, 1973

Inventor(s)   Donald Beggs and William T. Marston

It is certified that error appears in the above-identified patent and that said Letters Patent are hereby corrected as shown below:

Column 1, line 39, delete "from" and substitute therefor -- iron --;
         line 40, delete "at" and substitute therefor -- as --;
         line 65, delete "descent" and substitute therefor -- descend --.

Column 2, line 13, delete "is" and substitute therefor -- in --;
         line 47, delete "refurmer" and substitute therefor
                  -- reformer --;
         line 58, delete "convention" and substitute therefor
                  -- conventional --.

Column 3, line 11, delete "38" and substitute therefor -- 88 --.

Column 4, line 2, delete "off-cake" and substitute therefor
                  -- off-take --.

Claim 2, line 1, delete "5" and substitute therefor -- 1 --.

Claim 3, line 1, delete "5" and substitute therefor -- 1 --.

Claim 5, line 1, delete "10" and substitute therefor -- 4 --.

Signed and sealed this 18th day of December 1973.

(SEAL)
Attest:

EDWARD M. FLETCHER, JR.          RENE D. TEGTMEYER
Attesting Officer                Acting Commissioner of Patents